United States Patent [19]

Aronne

[11] Patent Number: 4,911,382

[45] Date of Patent: Mar. 27, 1990

[54] SAFE ELECTRO BALLISTIC ESCAPE SEQUENCING SYSTEM

[75] Inventor: Armand J. Aronne, Massapequa, N.Y.

[73] Assignee: Grumman Aerospace Corporation, Bethpage, N.Y.

[21] Appl. No.: 297,338

[22] Filed: Jan. 17, 1989

[51] Int. Cl.⁴ .............................. B64D 25/10
[52] U.S. Cl. .................... 244/122 AE; 102/207; 244/150; 244/122 R; 307/118; 307/114; 320/54
[58] Field of Search .... 244/149, 150, 122 R–122 AE; 307/118, 119, 144; 320/54; 429/112; 102/207, 208

[56] References Cited

U.S. PATENT DOCUMENTS

| | | | |
|---|---|---|---|
| 2,892,412 | 6/1959 | Mullins et al. | 102/207 |
| 3,051,872 | 8/1962 | Cowherd | 307/144 |
| 3,416,451 | 12/1968 | Hamerla | 102/207 |
| 3,547,383 | 12/1970 | Carpenter, Jr. | 244/150 |
| 3,560,863 | 2/1971 | Baumoel | 244/150 |
| 3,930,449 | 1/1976 | Buchele | 102/207 |
| 4,050,382 | 9/1977 | Power | 102/207 |
| 4,448,374 | 5/1984 | Duncan | 244/122 AE |
| 4,527,758 | 7/1985 | Ayoub | 244/150 |
| 4,792,903 | 12/1988 | Peck et al. | 244/122 AE |

*Primary Examiner*—Galen Barefoot
*Attorney, Agent, or Firm*—Bacon & Thomas

[57] ABSTRACT

An electro ballistic escape sequencing system is actuated only by the seat initiators. Current entering the system by any other means will see only open circuits. A pressure sensitive switch is provided in each circuit subject to outside interference and is normally in the open position. When ejection is required, pressure from one of the seat initiators activates the thermal battery and closes all circuits required for ejection.

13 Claims, 2 Drawing Sheets

SAFE ELECTRO BALLISTIC ESCAPE SEQUENCING SYSTEM

BACKGROUND OF THE INVENTION

1. Field of the Invention

This invention relates to the field of pressure initiated electrical systems and more particularly to a device for preventing unintended ejection and jettisoning of aircraft ejection seats and canopies in systems using an electro ballistic escape sequence.

2. Description of Related Art

Ejection seat systems are an essential part of many military airplanes and a few civilian airplanes. Such seats are well-known as a way of permitting the occupants of the aircraft to safely escape the airplane in the face of an emergency, so that a parachute can be safely employed to lower the occupant to the ground.

In such systems, the two primary concerns are the speed at which the occupant can be ejected after initiating the ejection sequence, and occupant safety. When ejection is required, the pilot and passengers must be able to clear the aircraft as quickly as possible, while at the same time avoid hitting any part of the aircraft, or each other. It is also essential to provide means for preventing unintended ejection of the seat. Unintended ejection could leave a plane without control and endanger the ejected pilot and passengers.

One system which has been proposed, the Electro Ballistic Escape Sequencing System (EBESS), uses gas pressure to initiate thermal battery ignition of electro explosive devices (EED's) which activate the various subsystems which make up the escape sequence. The system includes both redundancy and a time delay backup, and has proven to be relatively fast and reliable in comparison with previous systems.

Nevertheless, despite its numerous advantages, the currently proposed EBESS suffers from the critical drawback that it has not heretofore been possible to entirely prevent unintended ejection and jettisoning of the canopy and seats. Unintended ejections can be caused by a variety of forces, including nature (e.g., lightning); battle damage (e.g., a projectile through the thermal battery); maintenance errors; and a variety of man-made energy sources, including radio frequency emissions, electromagnetic pulses, and lasers.

SUMMARY OF THE INVENTION

It is an object of the invention to solve the drawbacks of the prior art by providing a system which prevents externally caused unintended activation of an electrically activated device, such as electro explosive device.

It is a further object of the invention to provide such a system in an electro ballistic escape sequencing system.

The first object is accomplished in a preferred embodiment of the invention by arranging switches in the device activation circuits which always remain open unless the device is intentionally activated.

The second object is accomplished by permitting the escape sequencing system to be actuated only by pressure generating seat initiators which are arranged to both initiate an ejection sequence and to close the above-mentioned switches. Electrical currents entering the system from any external source will see only open circuits.

More specifically, a pressure sensitive switch is provided in each closed circuit, and is normally biased in the open position. When ejection is required, pressure from the seat initiator both activates the thermal battery and closes all required circuits. Unless pressure is generated by the seat initiator, however, the thermal battery circuit and the EED circuits remain open.

DESCRIPTION OF THE PREFERRED EMBODIMENT

Figure 1:
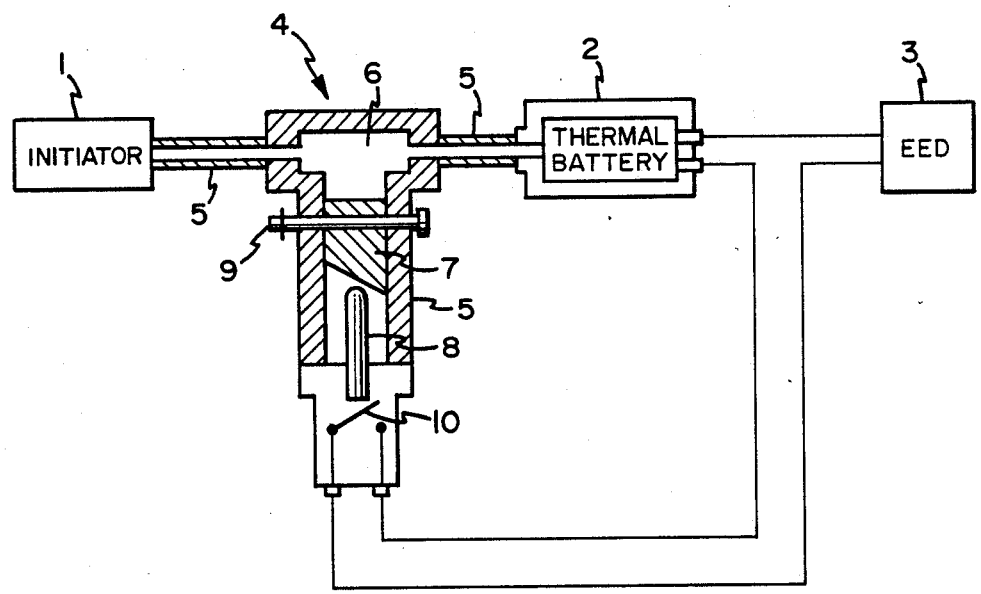
FIG. 1 is a schematic view of the pressure switch arrangement of a preferred embodiment of the invention.

FIG. 1 illustrates the placement of a pressure operated switch in accordance with the basic principle of the invention, to be described below. It will be appreciated, of course, that the details of the arrangement shown in FIG. 1 are exemplary and not intended to be limiting. Numerous modifications within the scope of the invention will inevitably occur to those skilled in the art.

Essentially, the basic principle of the invention is to provide a mechanism which will close an electrical circuit for carrying current from an electrical power source to an electrically activated device only when the power source is intentionally activated.

Elimination of closed circuits prevents external energy sources from causing current to flow in the system, which in the preferred embodiment includes an electro explosive device (EED). Such sources include lightning, electromagnetic pulses, radio frequency interference, and lasers, all of which could, directly or inductively cause a current to flow for a sufficiently long time in a closed EED triggering circuit to explode the EED. When the circuit is open, a steady state current is unlikely to be induced no matter what the source.

The circuit closing mechanism includes a switch 11, which is closed at the same time as a percussion or pressure actuated "thermal" battery 2. The thermal battery provides electrical power to EED 3.

A thermal battery is a battery in which the cathode and anode are normally isolated by a wall. The wall breaks down upon application of pressure, for example mechanical or hydraulic pressure, or pressure from an explosive charge in the battery, allowing the battery to charge in the manner of an ordinary battery i.e., by ion exchange between the respective terminals of the battery.

In the case of the illustrated preferred embodiment, the thermal battery is activated by gas pressure originating from an "initiator" 1. The initiator as pressure could result, for example, from a manually powered plunger, or from a suitable air compressor.

Switch 11 is closed by a pressure responsive piston mechanism 4 inserted into pressure line . The mechanism 4 includes a chamber 6 in communication with line 5, a piston 7 responsive to pressure in chamber 6, and a plunger 8 which causes switch 11 to close when the piston moves in response to an increase in pressure in chamber 6.

In order to prevent unintentional movement of the piston 7 a shear pin 9 is inserted through both the piston and the mechanism housing. The piston can move only when the pin 9 is broken in response to a threshold minimum pressure present in the chamber 6. Switch 11 should also be biased in an open position to further prevent unintentional closure.

In operation, switch 11 is normally open and thermal battery 2 is normally inactive. Currents induced in the circuit between thermal battery 2 and EED 3 resulting from external sources will be prevented from completing the circuit and triggering the EED.

When the initiator is actuated to cause sufficient gas pressure to activate the thermal battery, force is exerted upon piston 7, causing shear pin 9 to break, piston 7 to move in the direction of applied force, and plunger 9 to consequently close switch 11. Switch 11 remains closed until the thermal battery has charged up sufficiently to explode the EED. The entire cycle from initiation to explosion of the EED will generally take less than one second.

It will be appreciated that the embodiment as depicted in FIG. 1 may be used with thermal battery circuits connected to electrically activated devices other than EED's. Similarly, switch mechanism 4 will find application in connection with power arrangements other than thermal batteries.

An application of the preferred embodiment to a two-seat aircraft ejection system will now be described in connection with FIG. 2. Details known to those skilled in the art of ejection seat systems and not necessary to an understanding of the invention have been omitted. The details which have been included will enable one skilled in the art to insert the safety mechanism of the invention into any electro ballistic ejection system, including single seat systems.

Figure 2:
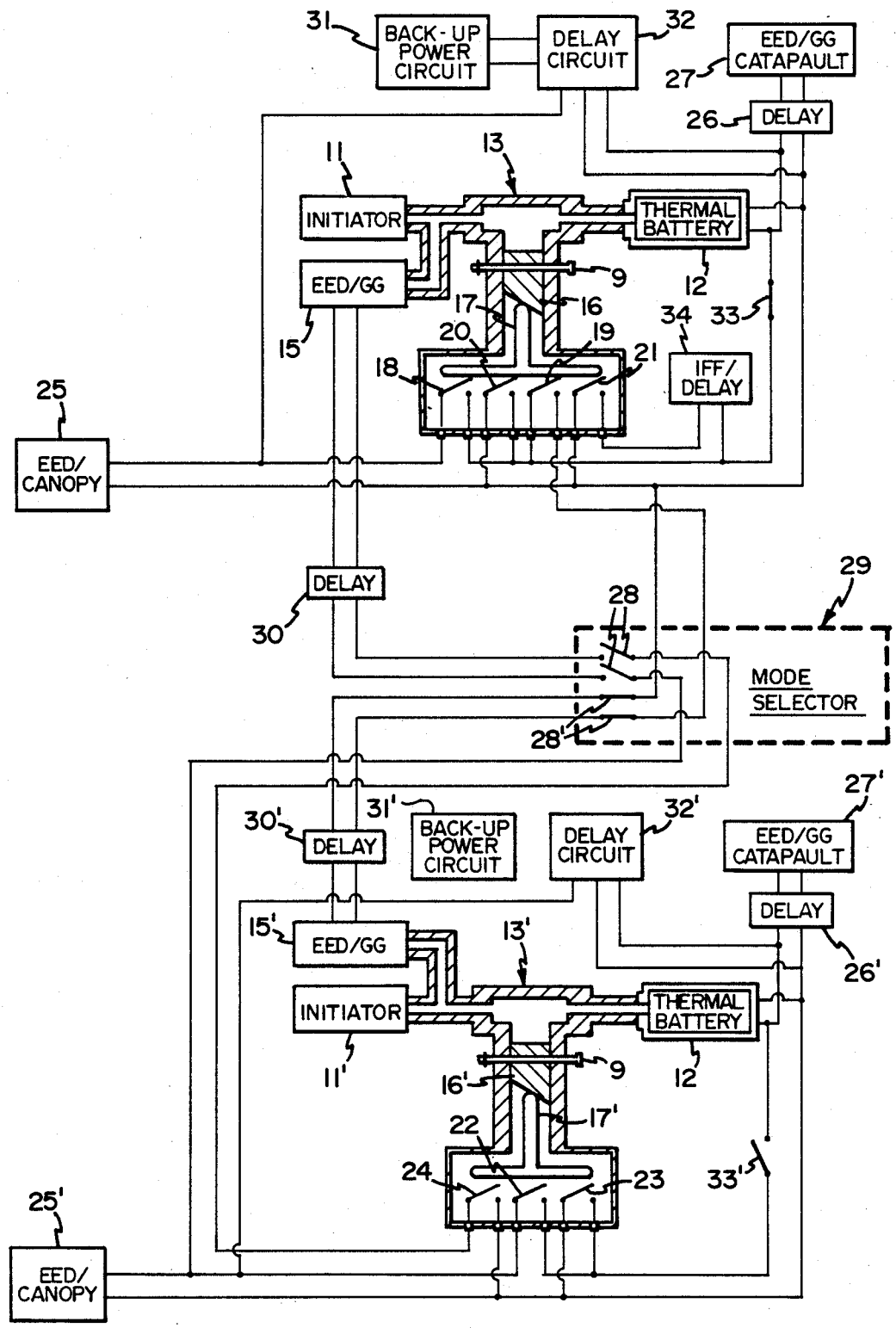
FIG. 2 illustrates an ejection seat system for a two seat aircraft using pressure switches of the type shown in FIG. 1.

In accordance with the basic principle of the invention as described above, every primary EED circuit of the illustrated embodiment in FIG. 2 is kept open until one of initiators 11 and 11' is actuated, i.e. each primary circuit is closed only when respective switches 18–24 are closed.

Each seat has a corresponding ejection system. The seats may be NACES (Navy Common Ejection Seat) or other electro ballistically triggerable ejection seats. The respective seats are launched by EED triggered catapults 27 and 27'. The EED's are used to generate gas pressure which powers the seat catapults (not shown), although it is within the scope of the invention to use the EED's to ignite rockets or other known launch systems.

Before the seat is ejected, it is necessary to first break or eject the canopy which covers the cockpit. For this purpose, electro explosive devices 25 and 25' are used to trigger a canopy rocket or catapult (not shown), or to shatter the canopy by igniting "flexible linear shaped charges" (FLSC's). Both canopy jettison rockets and FLSC's are well-known in the art of aircraft ejection, and the safety mechanism of the preferred embodiment is equally applicable thereto.

To shorten the ejection sequence as much as possible, one of the canopy EED's 25 and 25' is fired by the thermal battery without any delay except for the inherent delay resulting from the charging time of the thermal battery Triggering of the seat catapult EED's 27 and 27', on the other hand, must be delayed for a time sufficient to permit jettisoning or clearing of the canopy away from the airplane. Thus, delays 26 and 26' are provided for each seat EED 27 and 27'. Alternatively, interlocks may be substituted for delays 13, 13', the interlocks comprising switches which close only when the canopy has been jettisoned.

In addition to the canopy and seat EED's, other devices which may be part of a normal eject sequence are triggerable by EED's connected in the same manner as the canopy and seat catapult EED's. These include identification signal generators, harness systems, and separate canopy breaking and jettisoning systems. The EED's of the additional systems are connected through pressure responsive switch mechanisms in exactly the same manner as EED's 27, 27', 25 and 25'. The only one of these devices shown in FIG. 2 is an "identification friend or foe" (IFF) signal generator 34, which includes an appropriate delay.

All of the respective EED's are powered by thermal batteries 12 and 12'. One terminal of each battery is directly connected to the respective EED's, through delays where appropriate, while the other terminal is connected through switch mechanisms 13, and 13'. Every EED is isolated from every other EED and from the thermal battery by at least one normally open switch in one of the switch mechanisms.

As illustrated in FIG. 2, a switch mechanism 13 is located so as to open the canopy EED circuit, the catapult EED circuit, and a circuit leading to an EED gas generator located on the second seat of the plane, as will be explained below. Switch mechanism 13' controls both the catapult and canopy circuits for its seat, and a corresponding EED gas generator for the other seat.

It should be recognized, of course, that a separate switch mechanism could be provided for each EED circuit, or all of the switches could be located in a single switch mechanism, so long as each switch is closable only in response to intended pressure from one of the initiators.

Each of the switch mechanisms 13 and 13' includes the same elements as the switch mechanism shown in FIG. 1, including pistons 16 and 16', plungers 17 and 17', and switches 18–24. The plungers are shaped according to the number of switches controlled by the mechanisms, the number being essentially a matter of convenience. The operation of the invention is the same whether one mechanism having multiple switches is provided for each initiator, or multiple mechanisms having one or two switches each.

A mode selector 29 permits selection of an initiator and the sequence in which the seats and canopies are ejected or jettisoned. A single initiator can be used to actuate both seat ejection sequences.

When switches 28 are open and switches 28' are closed, for example by turning a rotary dial, activation of thermal battery 12 and closure of switch mechanism 13 will, after a suitable delay provided by delay 30', cause EED gas generator 15' to generate gas pressure which closes switch mechanism 13" and activates thermal battery 12'

On the other hand, activation of battery 12' and closure of switch mechanism 13' causes EED 15 to explode and generate pressure which activates battery 12 and mechanism 13.) If both switches are open, then a solo mode, i.e., a single seat ejection mode, can be selected.

In order to prevent both seats from being ejected at the same time, interlocks 33 and 33' are provided. The interlocks delay activation of the second seat circuit until the first has been properly fired. It will be noted that, regardless of the position of the mode selection switches 28 and 28' and interlocks 33 and 33', each of the circuits through the mode selector will normally remain open due to the presence of switches 19 and 21.

In practice, each of the thermal battery circuits may be provided with a redundant counterpart (not shown) to provide backup power in case of failure of the primary system.

Furthermore, automatic backup power supply circuits 31 and 31' may be provided. These circuits do not require a pressure switch mechanism because they use delays of sufficiently long duration, greater than one second, that closure of the circuits will not initiate an ejection sequence. Nevertheless, it is within the scope of the invention to provide safety switch mechanisms in the backup circuit as well as in the primary energization circuit.

It will of course be recognized that the foregoing description of the invention is not intended to limit the invention to the precise form disclosed, and that other modifications and variations will be possible in light of the above teachings. It is therefore intended that the appended claims be construed to include all alternative embodiments and modifications of the invention except insofar as they are limited by the prior art.

I claim:

1. An arrangement for preventing an electrical device from being unintentionally supplied with current, comprising:
    a pressure activated electrical power source;
    initiation means for generating pressure to activate said power source and pressure line means for transmitting said pressure to said power source;
    an electric circuit from said power source to an electrical device;
    a normally open switch in said electric circuit, closure of said switch being necessary to complete said circuit; and
    closure means in said pressure line means arranged to prevent closure of said switch unless said initiation means generates sufficient pressure in said pressure line means to activate said power source.

2. An arrangement as claimed in claim 1, wherein said closure means includes a movable pressure responsive means arranged to be moved in response to pressure in said pressure line means above a predetermined minimum pressure and to cause said switch to close when moved in response to the pressure exceeding the predetermined minimum pressure.

3. An arrangement as claimed in claim 2, including means for positively locking said pressure responsive means against motion unless said predetermined minimum pressure is exceeded in said pressure line.

4. An arrangement as claimed in claim 1, wherein said electrical device is an electro explosive device.

5. An arrangement as claimed in claims 1 or 4, wherein said electrical power source is a thermal battery.

6. An arrangement for preventing unintentional ejection of an ejection seat from an airplane, comprising:
    initiation means for initiating a seat ejection sequence in response to intentional actuation of said means;
    electrical power source means for generating electrical power in response to initiation of an ejection sequence by said initiation means;
    a normally open electric circuit means from said power source means to an electrically activated means for causing ejection of said seat when electrical power is supplied to said electric circuit means;
    and closure means for causing said electric circuit means to close only when said initiation means is intentionally actuated.

7. An arrangement as claimed in claim 6, wherein said initiation means is arranged to initiate said sequence by providing pressure through a pressure line to said power source means.

8. An arrangement as claimed in claim 7, wherein a normally open electrical switch means comprises said normally open electric circuit means and said closure means includes a pressure responsive means arranged to move in response to said pressure and further arranged to actuate said switch to close the switch when said initiation means initiates said sequence, said switch remaining open at all other times.

9. An arrangement as claimed in claim 7, wherein said electrical power source means is a pressure-activated thermal battery.

10. An arrangement as claimed in claims 6 or 8, wherein said electrically activated device is an electro explosive device.

11. An arrangement as claimed in claim 10, further including a second electro explosive device, a second normally open electric circuit means from said power source means to said second electro explosive device, and additional closure means for causing said second electric circuit means to close only when said initiation means is intentionally actuated.

12. An arrangement as claimed in claim 8, including locking means for positively locking said pressure responsive means against motion unless said pressure exceeds a predetermined minimum pressure.

13. An arrangement as claimed in claim 12 wherein said pressure responsive means comprises a piston slidable in a cylinder; means for communicating said pressure to one side of the piston; and wherein said locking means comprises a shear pin arranged to lock the piston to the cylinder until sheared by piston movement.

* * * * *